(12) United States Patent
Abe et al.

(10) Patent No.: US 9,253,297 B2
(45) Date of Patent: Feb. 2, 2016

(54) SOUND-TRANSMITTING MEMBRANE FOR MICROPHONE, SOUND-TRANSMITTING MEMBRANE MEMBER FOR MICROPHONE PROVIDED WITH THE MEMBRANE, MICROPHONE, AND ELECTRONIC DEVICE PROVIDED WITH MICROPHONE

(75) Inventors: Yuuichi Abe, Osaka (JP); Kouji Furuuchi, Osaka (JP); Kousei Takiishi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 513 days.

(21) Appl. No.: 13/141,934

(22) PCT Filed: Sep. 3, 2010

(86) PCT No.: PCT/JP2010/005432
§ 371 (c)(1),
(2), (4) Date: Jun. 23, 2011

(87) PCT Pub. No.: WO2011/027572
PCT Pub. Date: Mar. 10, 2011

(65) Prior Publication Data
US 2011/0255728 A1    Oct. 20, 2011

(30) Foreign Application Priority Data
Sep. 4, 2009   (JP) .................................. 2009-204826

(51) Int. Cl.
*H04M 1/03* (2006.01)
*H04R 1/08* (2006.01)

(52) U.S. Cl.
CPC ...... *H04M 1/03* (2013.01); *H04R 1/086* (2013.01)

(58) Field of Classification Search
CPC ........ H04R 1/083; H04R 1/086; H04R 1/342; H04R 1/38; H04R 1/021; H04R 17/02; H04R 17/025; H04R 31/00; H04R 19/04
USPC .................................................... 381/355–361
See application file for complete search history.

(56) References Cited

U.S. PATENT DOCUMENTS 4,113,999 A * 9/1978 Swinehart ........................ 381/91
5,491,478 A * 2/1996 de la Luz et al. ................ 341/22

(Continued)

FOREIGN PATENT DOCUMENTS

| CN | 201039420 | 3/2008 |
|---|---|---|
| JP | 8-079865 | 3/1996 |

(Continued)

*Primary Examiner* — Davetta W Goins
*Assistant Examiner* — Jasmine Pritchard
(74) *Attorney, Agent, or Firm* — Hamre, Schumann, Mueller & Larson, P.C.

(57) ABSTRACT

The present invention provides a sound-transmitting membrane for a microphone, to be disposed to a sound-collecting opening of the microphone so as to allow sound to transmit through the membrane while preventing a foreign matter from entering into the microphone through the opening. This membrane for a microphone prevents the entry of a foreign matter, such as fine dust and water vapor, that is difficult for conventional sound-transmitting membranes to block, and ensures the microphone performance. This membrane for a microphone is composed of a nonporous film or a multilayer membrane including a nonporous film, has a surface density of 30 g/m² or less, and has a sound transmission loss of less than 3 dB in a frequency range of 300 to 4000 Hz.

12 Claims, 4 Drawing Sheets

(56) References Cited

U.S. PATENT DOCUMENTS

| | | | |
|---|---|---|---|
| 5,673,330 A * | 9/1997 | Chang | 381/177 |
| 5,828,012 A * | 10/1998 | Repolle et al. | 181/175 |
| 6,164,409 A * | 12/2000 | Berger | 181/135 |
| 6,243,474 B1 * | 6/2001 | Tai et al. | 381/174 |
| 6,347,147 B1 * | 2/2002 | Downs et al. | 381/114 |
| 6,512,834 B1 * | 1/2003 | Banter et al. | 381/386 |
| 2005/0018866 A1 * | 1/2005 | Schulein et al. | 381/325 |
| 2005/0077102 A1 * | 4/2005 | Banter et al. | 181/149 |
| 2006/0177085 A1 * | 8/2006 | Izuchi | H04R 1/086 381/369 |
| 2008/0025537 A1 * | 1/2008 | Ritter et al. | 381/314 |
| 2009/0046882 A1 * | 2/2009 | Sakurai | H04R 1/083 381/359 |
| 2009/0268928 A1 * | 10/2009 | Ikeyama et al. | 381/150 |
| 2010/0247857 A1 * | 9/2010 | Sanami et al. | 428/138 |

FOREIGN PATENT DOCUMENTS

| | | |
|---|---|---|
| JP | 2004-083811 | 3/2004 |
| JP | 2007-081881 | 3/2007 |
| JP | 2007-184952 | 7/2007 |
| JP | 2008-199225 | 8/2008 |
| JP | 2008-245332 | 10/2008 |

* cited by examiner

SOUND-TRANSMITTING MEMBRANE FOR MICROPHONE, SOUND-TRANSMITTING MEMBRANE MEMBER FOR MICROPHONE PROVIDED WITH THE MEMBRANE, MICROPHONE, AND ELECTRONIC DEVICE PROVIDED WITH MICROPHONE

TECHNICAL FIELD

The present invention relates to a sound-transmitting membrane for a microphone that allows sound to transmit through the sound-transmitting membrane to a sound transducer of the microphone while preventing a foreign matter from entering into the sound transducer. The present invention also relates to a sound-transmitting membrane member for a microphone including the sound-transmitting membrane, a microphone, and an electronic device having a microphone.

BACKGROUND ART

Electronic devices, such as mobile phones and digital cameras, equipped with a microphone have been widely used. Generally, the microphone of these electronic devices is a compact capacitor microphone. Usually, the microphone is accommodated in a casing of the electronic device as a microphone unit in which a sound transducer (sound-collecting part) having a diaphragm and a back plate is accommodated in a housing of the unit. The sound from the outside is guided to the sound transducer of the microphone through both a sound-collecting opening provided to the casing and a sound-collecting opening provided to the housing. When a foreign matter, such as dust, enters into the microphone through these sound-collecting openings, the vibration of the foreign matter occurs in the vicinity of the sound transducer, generating noise. In addition, the entry of a foreign matter into the sound transducer leads to a failure of the microphone. Therefore, a sound-transmitting membrane that allows sound to transmit through the sound-transmitting membrane while preventing the entry of the foreign matter generally is disposed at the sound-collecting opening of at least one member selected from the casing and the housing. Disposing the sound-transmitting membrane also suppresses the noise generated by the blow-in of wind or breath.

Conventionally, a porous sheet having air permeability is used as the sound-transmitting membrane. JP 2008-199225 A discloses that a woven fabric or nonwoven fabric produced from fibers made of a resin, such as nylon and polyethylene, can be used as a sound-transmitting membrane. JP 2007-81881 A discloses that a porous polytetrafluoroethylene (PTFE) membrane can be used as a sound-transmitting membrane. The latter sound-transmitting membrane is expected to suppress the entry of water as well as dust, as foreign matters, judging from the properties of the porous PTFE membrane.

CITATION LIST

Patent Literature

PTL 1 JP 2008-199225 A
PTL 2: JP 2007-81881 A

SUMMARY OF INVENTION

Technical Problem

However, in the case where a porous sheet is used as a sound-transmitting membrane, its air permeability makes it difficult to prevent the entry of fine dust. Although a sound-transmitting membrane is used also for a sound emitting part, such as a speaker and a buzzer, of an electronic device as is used for a microphone, the fine dust hardly be a problem to the sound emitting part. In contrast, the fine dust is a serious problem to the microphone because it generates noise and causes a failure to the microphone. Therefore, a sound-transmitting membrane that prevents the entry of fine dust is desired.

Use of a porous PTFE membrane with its average pore diameter being adjusted can block water as well as most fine dust, but cannot prevent water vapor from transmitting therethrough. When the water vapor that has transmitted through the membrane condenses at the sound transducer, it is eventually the same as not preventing the water entry.

Solution to Problem

As described above, a porous sheet (porous membrane) having air permeability conventionally has been used as the sound-transmitting membrane for a microphone, and a membrane having no air permeability has not been used. This is because it has been thought essential for the sound-transmitting membrane to have air permeability to ensure the microphone performance. It always has been a common technical knowledge for a person skilled in the art to use a porous sheet having air permeability as the sound-transmitting membrane for a microphone. Challenging this common technical knowledge, the present inventors studied anew whether the air permeability of the sound-transmitting membrane is essential to ensure the microphone performance. As a result, they found the following, although quite unexpected. (1) Whether or not a sound-transmitting membrane has air permeability does not so much affect the sound pressure of the sound that is transmitting through the membrane, although it affects significantly the distortion of the sound that is transmitting through the membrane (in the case where the sound-transmitting membrane has no air permeability, the sound distortion caused when the sound transmits through the membrane is larger than in the case where the sound-transmitting membrane has air permeability). (2) For a sound-transmitting membrane for a speaker, it is essential to have air permeability because the sound distortion caused through the sound-transmitting membrane affects significantly the quality of the sound to be heard. (3) A variation in sound pressure caused through the sound-transmitting membrane affects the microphone performance significantly, but the sound distortion does not so much affect it probably because the sound-transmitting membrane is far from the sound source. That is, considering "the sound quality deterioration due to the sound distortion" that occurs when a membrane having no air permeability is used as the sound-transmitting membrane for a speaker, a person skilled in the art has thought conventionally that it is essential also for a sound-transmitting membrane for a microphone to have air permeability. However, the present inventors have found that actually the sound-transmitting membrane for a microphone does not necessarily have to have air permeability to ensure the microphone performance, and that the microphone performance is ensured, under given conditions, also in the case where a nonporous film having no air permeability is used as the sound-transmitting membrane for a microphone.

The present invention provides a sound-transmitting membrane for a microphone, to be disposed to a sound-collecting opening of the microphone so as to allow sound to transmit through the sound-transmitting membrane while preventing a foreign matter from entering into a sound transducer of the microphone through the sound-collecting opening. The sound-transmitting membrane according to the present invention is composed of a nonporous film or a multilayer membrane including a nonporous film, has a surface density of 30 g/m² or less, and has a sound transmission loss of less than 3 dB in a frequency range of 300 to 4000 Hz.

The present invention provides a sound-transmitting membrane member for a microphone, including: a sound-transmitting membrane to be disposed to a sound-collecting opening of the microphone and/or a sound-collecting opening of a casing of an electronic device having the microphone so as to allow sound to transmit through the sound-transmitting membrane while preventing a foreign matter from entering into a sound transducer of the microphone through the sound-collecting opening; and a double-sided adhesive sheet for bonding the sound-transmitting membrane to a member having the sound-collecting opening so as to cover the sound-collecting opening. The sound-transmitting membrane is the sound-transmitting membrane for a microphone according to the present invention. The double-sided adhesive sheet is placed on a peripheral portion of at least one main surface of the sound-transmitting membrane.

The present invention provides a microphone including: a sound transducer; a housing that accommodates the sound transducer and has a sound-collecting opening for guiding sound to the sound transducer; and a sound-transmitting membrane that is bonded to the housing so as to cover the sound-collecting opening and allows sound to transmit through the sound-transmitting membrane while preventing a foreign matter from entering into the sound transducer through the sound-collecting opening. The sound-transmitting membrane is the sound-transmitting membrane for a microphone according to the present invention.

The present invention provides an electronic device having a microphone, including: a microphone including a sound transducer and a housing that accommodates the sound transducer and has a sound-collecting opening for guiding sound to the sound transducer; a casing that accommodates the microphone and has a sound-collecting opening for guiding sound to the microphone; and a sound-transmitting membrane that is bonded to at least one member selected from the housing and the casing so as to cover the sound-collecting opening of the at least one member and that allows sound to transmit through the sound-transmitting membrane while preventing a foreign matter from entering into the sound transducer through the sound-collecting opening of the at least one member. The sound-transmitting membrane is the sound-transmitting membrane for a microphone according to the present invention.

Advantageous Effects of Invention

The sound-transmitting membrane for a microphone according to the present invention is composed of a nonporous film or a multilayer membrane including a nonporous film. Thus, it can prevent a foreign matter, such as fine dust, that is difficult for conventional sound-transmitting membranes to block from entering into the sound transducer of the microphone. Also, the sound-transmitting membrane for a microphone according to the present invention can prevent water vapor (the breath of a speaker contains a significantly large amount of water vapor) from entering into the sound transducer, and can suppress the water condensation at the sound transducer, which is observed with the conventional sound-transmitting membranes. Furthermore, by allowing the sound-transmitting membrane to have a surface density of 30 g/m² or less and a sound transmission loss of less than 3 dB in a frequency range of 300 to 4000 Hz, it is also possible to ensure the microphone performance when the sound-transmitting membrane is disposed. The microphone according to the present invention including such a sound-transmitting membrane is highly reliable because the noise generation and failure caused by the entry of a foreign matter into the sound transducer are reduced.

DESCRIPTION OF EMBODIMENTS

Sound-Transmitting Membrane for Microphone

Figure 1:
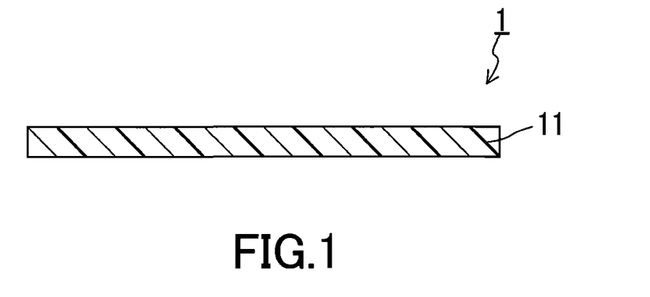
FIG. 1 is a cross-sectional view showing schematically an example of the sound-transmitting membrane for a microphone according to the present invention.

FIG. 1 shows an example of the sound-transmitting membrane for a microphone according to the present invention. A sound-transmitting membrane for a microphone (hereinafter referred to simply as a "sound-transmitting membrane") 1 shown in FIG. 1 is a nonporous film 11.

The sound-transmitting membrane 1 has a surface density of 30 g/m² or less. The surface density of the sound-transmitting membrane 1 is a value obtained by dividing the weight of the membrane by the area of a main surface of the membrane. In other words, the surface density is a weight per unit area of the main surface of the sound-transmitting membrane 1. The surface density of the sound-transmitting membrane affects significantly the variation in sound pressure when the sound transmits through the membrane. Moreover, the sound-transmitting membrane 1 has a sound transmission loss of less than 3 dB in a frequency range of 300 to 4000 Hz. Thereby, the sound-transmitting membrane 1 can ensure the microphone performance at the time of use, that is, when the sound-transmitting membrane 1 is disposed to a sound-collecting opening for guiding sound to the sound transducer of the microphone. The sound transmission loss is a value reflecting a variation in sound pressure (sound pressure loss) when the sound transmits through an object to be evaluated. When the sound transmission loss is less than 3 dB, a variation therein cannot be sensed by human hearing. The sound transmission loss in a frequency range of 300 to 4000 Hz indicates an average value of sound transmission losses in this frequency range. Hereinafter, the sound transmission loss in the frequency range of 300 to 4000 Hz is referred to simply as a "sound transmission loss." The frequency of 300 to 4000 Hz corresponds to the frequency of human voice. These limitations about the surface density and the sound transmission loss are very important because the sound-transmitting membrane according to the present invention is composed not of a porous sheet but of a nonporous film or a multilayer membrane including a nonporous film.

Preferably, the surface density of the sound-transmitting membrane 1 is 25 g/m$^2$ or less, more preferably 20 g/m$^2$ or less, and further preferably 15 g/m$^2$ or less. In this case, the sound transmission loss of the sound-transmitting membrane 1 is further decreased. The lower limit of the surface density of the sound-transmitting membrane 1 is not particularly limited, and it is 1 g/m$^2$, for example. Preferably, the lower limit is 10 g/m$^2$. An excessively small surface density lowers the strength of the sound-transmitting membrane 1, making the sound-transmitting membrane 1 vulnerable to a damage caused by a foreign matter. Preferably, the surface density of the sound-transmitting membrane 1 falls between the lower limit or preferable lower limit, and the upper limit or preferable upper limit.

The lower limit of the sound transmission loss of the sound-transmitting membrane 1 is not particularly limited. From the viewpoint of microphone performance, a smaller sound transmission loss is better. The lower limit of the sound transmission loss of the sound-transmitting membrane 1 is 0.5 dB, for example. The sound transmission loss of the sound-transmitting membrane 1 is 0.5 dB or more but less than 3 dB, for example.

The structure and material of the nonporous film 11 are not particularly limited. The nonporous film 11 is made of, for example, metal or resin, or a composite material of these. Typically, the nonporous film 11 is a resin film. The type of the resin is not particularly limited. Polytetrafluoroethylene (PTFE), polyester (PET), polycarbonate, polyethylene (PE), and polyimide can be used, for example. The term "nonporous" means that no fine pore that brings one main surface of the film into communication with the other main surface is present. For example, a film in which the air permeability between one main surface and the other main surface is zero can be determined as a nonporous film.

Preferably, the nonporous film 11 is a PTFE film or a PET film because they have a weight and a strength in good balance. Particularly, the PTFE film is preferable.

The thickness of the nonporous film 11 is not particularly limited as long as the nonporous film 11 has a surface density of 30 g/m$^2$ or less and a sound transmission loss of less than 3 dB when serving as the sound-transmitting membrane 1.

The sound-transmitting membrane 1 may be composed of two or more layers of nonporous films 11. In this case, the types of these nonporous films 11 may be the same as or different from each other. From the viewpoint of minimizing the sound transmission loss of the sound-transmitting membrane 1, it is preferable that the sound-transmitting membrane 1 is a single layer membrane composed of the nonporous film 11 as shown in FIG. 1.

Figure 2:
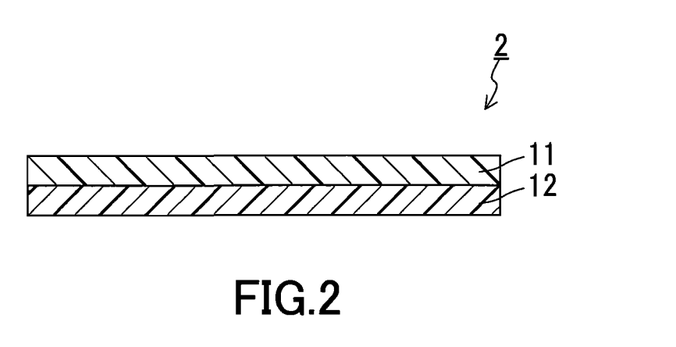
FIG. 2 is a cross-sectional view showing schematically another example of the sound-transmitting membrane for a microphone according to the present invention.

FIG. 2 shows another example of the sound-transmitting membrane according to the present invention. A sound-transmitting membrane 2 shown in FIG. 2 is a multilayer membrane composed of the nonporous film 11 and an air-permeable supporting member 12.

The surface density of the sound-transmitting membrane 2 (the surface density of the multilayer membrane including the nonporous film 11 and the air-permeable supporting member 12) is 30 g/m$^2$ or less. Moreover, the sound transmission loss of the sound-transmitting membrane 2 is less than 3 dB. Thereby, the sound-transmitting membrane 2 can ensure the microphone performance at the time of use.

Preferably, the surface density of the sound-transmitting membrane 2 (the surface density of the multilayer membrane including the nonporous film 11 and the air-permeable supporting member 12) is 25 g/m$^2$ or less, more preferably 20 g/m$^2$ or less, and further preferably 15 g/m$^2$ or less. In this case, the sound transmission loss of the sound-transmitting membrane 2 is further decreased. As in the sound-transmitting membrane 1, the lower limit of the surface density is not particularly limited, either, in the sound-transmitting membrane 2 composed of the multilayer membrane including the nonporous film 11. For example, the lower limit is 1 g/m$^2$. Preferably, it is 10 g/m$^2$. Preferably, the surface density of the sound-transmitting membrane 2 falls between this lower limit or the preferable lower limit, and the above-mentioned upper limit or preferable upper limit.

The sound transmission loss of the sound-transmitting membrane 2 (the sound transmission loss of the multilayer membrane including the nonporous film 11 and the air-permeable supporting member 12) is less than 3 dB. As in the sound-transmitting membrane 1, the lower limit of the sound transmission loss is not particularly limited, either, in the sound-transmitting membrane 2 composed of the multilayer membrane including the nonporous film 11. From the viewpoint of microphone performance, a smaller sound transmission loss is better. The lower limit of the sound transmission loss of the sound-transmitting membrane 2 is, for example, 0.5 dB. The sound transmission loss of the sound-transmitting membrane 2 is, for example, 0.5 dB or more but less than 3 dB.

The nonporous film 11 is the same as the nonporous film 11 of the sound-transmitting membrane 1 shown in FIG. 1.

The air-permeable supporting member 12 is an air-permeable layer to support the nonporous film 11 and enhance the strength of the sound-transmitting membrane 2. Typically, the air-permeable supporting member 12 is a woven fabric, nonwoven fabric, mesh, net, sponge, foam, or porous body made of metal or resin, or a composite material of these. The resin is, for example, polyolefin, polyester, polyamide, polyimide, aramid, fluororesin, and ultra high molecular weight polyethylene. In the sound-transmitting membrane 2 shown in FIG. 2, the nonporous film 11 and the air-permeable supporting member 12 are laminated and integrated with each other. They may be bonded to each other by various kinds of bonding methods, such as heat lamination, heat welding, and ultrasonic welding, when they are being laminated and integrated with each other.

The thicknesses of the nonporous film 11 and the air-permeable supporting member 12 are not particularly limited as long as the sound-transmitting membrane 2 has a surface density of 30 g/m$^2$ or less and a sound transmission loss of less than 3 dB.

The sound-transmitting membrane 2 may have two or more layers of nonporous films 11 and/or two or more layers of air-permeable supporting members 12, and the order in which these layers are laminated is not particularly limited. In the case where the sound-transmitting membrane 2 has two or more layers of nonporous films 11, the types of these nonporous films 11 may be the same as or different from each other. In the case where the sound-transmitting membrane 2 has two or more layers of air-permeable supporting members 12, the types of these air-permeable supporting members 12 may be the same as or different from each other.

The sound-transmitting membrane 2 may have an arbitrary layer other than the nonporous film 11 and the air-permeable supporting member 12 as long as the effects of the present invention can be achieved. From the viewpoint of minimizing the sound transmission loss, it is preferable that the sound-transmitting membrane 2 is composed of one nonporous film 11 and one air-permeable supporting member 12 as shown in FIG. 2.

The sound-transmitting membrane 1 or 2 is disposed appropriately to the sound-collecting opening of a microphone or the sound-collecting opening of an electronic device having a microphone so as to allow sound to transmit through the sound-transmitting membrane 1 or 2 while preventing a foreign matter, such as dust and water, from entering into the sound transducer of the microphone through the sound-collecting opening. Thereby, the microphone performance is ensured while the noise generation and failure are reduced.

[Sound-Transmitting Membrane Member for Microphone]

Figure 3:
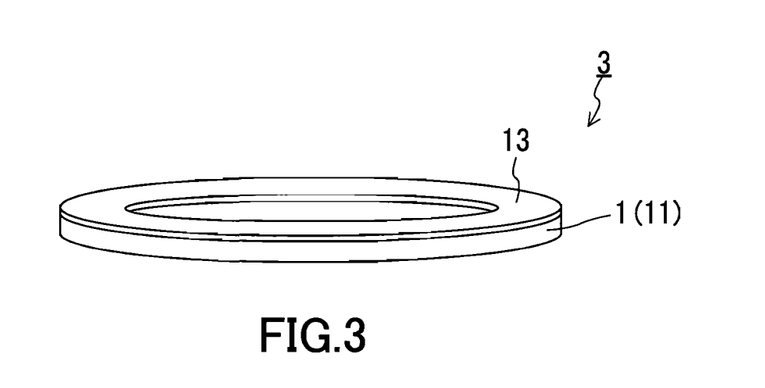
FIG. 3 is a perspective view showing schematically an example of the sound-transmitting membrane member for a microphone according to the present invention.

FIG. 3 shows an example of the sound-transmitting membrane member for a microphone (hereinafter referred to simply as a "sound-transmitting membrane member") according to the present invention. A sound-transmitting membrane member 3 shown in FIG. 3 includes: the single-layer sound-transmitting membrane 1 of the nonporous sheet 11; and a double-sided adhesive sheet 13 for bonding the sound-transmitting membrane 1 to a member having a sound-collecting opening so as to cover the sound-collecting opening. The double-sided adhesive sheet 13 shown in FIG. 3 has a ring shape and is bonded to a peripheral portion of one main surface of the disk-shape sound-transmitting membrane 1. The member having a sound-collecting opening is a member constituting the microphone or the electronic device having a microphone. For example, it is a housing of the microphone accommodating the sound transducer, or a casing of the electronic device having a microphone.

The double-sided adhesive sheet 13 included in the sound-transmitting membrane member 3 makes it easy to bond the sound-transmitting membrane 1 to the member having a sound-collecting opening. The sound-transmitting membrane member 3 is bonded to the member having a sound-collecting opening so as to cover the sound-collecting opening, so that the sound-transmitting membrane member 3 allows sound to transmit through the sound-transmitting membrane member 3 while preventing a foreign matter, such as dust and water, from entering into the sound transducer of the microphone through the sound-collecting opening. Thereby, it is possible to ensure the microphone performance while reducing the noise generation and failure.

Furthermore, in the sound-transmitting membrane member 3, the double-sided adhesive sheet 13 reinforces the sound-transmitting membrane 1. This makes it easy to handle the sound-transmitting membrane 1.

The sound-transmitting membrane included in the sound-transmitting membrane member according to the present invention is the sound-transmitting membrane according to the present invention mentioned above. The shape of the sound-transmitting membrane is not particularly limited. It may be a circular shape as shown in FIG. 3, or may be another shape (such as an ellipse shape and a rectangular shape).

The shape, structure, and material of the double-sided adhesive sheet 13 are not particularly limited as long as the sheet 13 allows the sound-transmitting membrane to be bonded to the member having a sound-collecting opening so as to cover the sound-collecting opening and allows sound to transmit to the sound transducer of the microphone through the sound-collecting opening. As shown in FIG. 3, in the case where the sound-transmitting membrane 1 has a circular shape, the double-sided adhesive sheet 13 has typically a ring shape.

Preferably, the double-sided adhesive sheet 13 has heat resistance.

Figure 5:
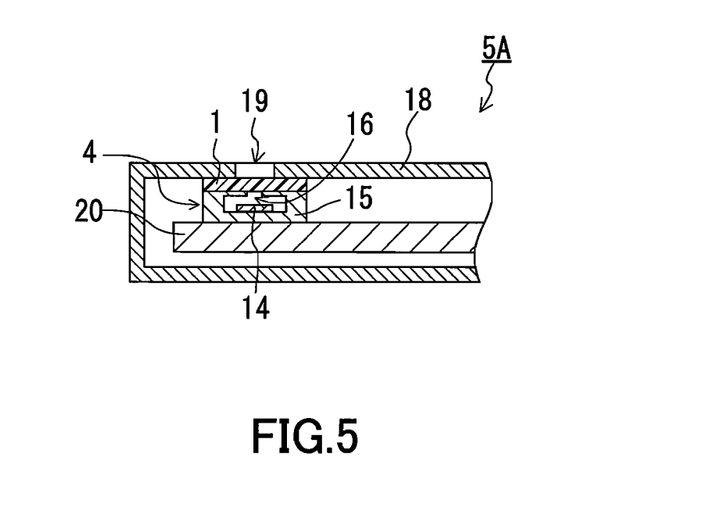
FIG. 5 is a cross-sectional view showing schematically an example of the electronic device having a microphone according to the present invention.

In the sound-transmitting membrane member according to the present invention, the double-sided adhesive sheets may be placed on peripheral portions of both main surfaces of the sound-transmitting membrane, respectively. In this case, as shown in FIG. 5, for example, these two double-sided adhesive sheets allow two or more members having a sound-collecting opening to be bonded to the sound-transmitting membrane member so as to sandwich the sound-transmitting membrane member therebetween.

[Microphone]

Figure 4:
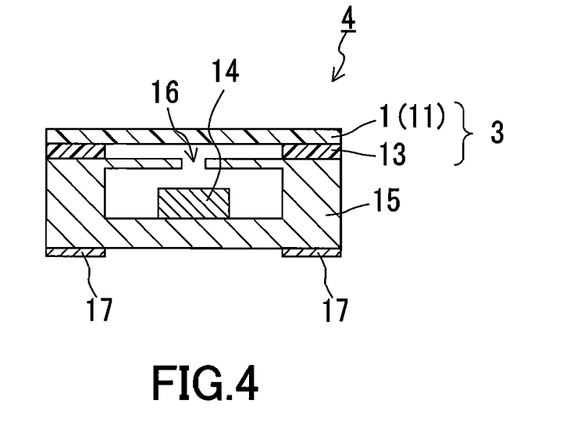
FIG. 4 is a cross-sectional view showing schematically an example of the microphone according to the present invention.

FIG. 4 shows an example of the microphone according to the present invention. A microphone 4 shown in FIG. 4 is a so-called microphone unit having a configuration in which a sound transducer 14 for converting sound into electric signals is accommodated in a housing 15. The housing 15 is a rectangular parallelepiped with the inside being hollow. The housing 15 has, in one surface thereof, a sound-collecting opening 16 for guiding sound from the outside to the sound transducer 14. The sound-transmitting membrane 1 according to the present invention is bonded to the housing 15 via the double-sided adhesive sheet 13 so as to cover the sound-collecting opening 16. The double-sided adhesive sheet 13 is bonded to the peripheral portion of one main surface of the sound-transmitting membrane 1. The sound-transmitting membrane 1 and the double-sided adhesive sheet 13 serve also as the sound-transmitting membrane member 3 according to the present invention. The housing 15 is provided, at a bottom surface thereof, with a pair of terminals 17 for outputting the electric signals into which the sound has been converted by the sound transducer 14. The microphone 4 is disposed on a circuit board, for example, and used with the terminals 17 being connected electrically to the circuit board.

In the microphone 4, the sound-transmitting membrane 1 disposed so as to cover the sound-collecting opening 16 allows sound to transmit through the sound-transmitting membrane 1 to the sound transducer 14 while preventing a foreign matter, such as dust and water, from entering into the sound transducer 14 through the sound-collecting opening 16. Thereby, it is possible to ensure the microphone performance while reducing the noise generation and failure.

The structure of the sound transducer 14 is not particularly limited. In the case where the microphone 4 is a capacitor microphone (electret capacitor microphone, or "ECM"), the sound transducer 14 has a diaphragm and a back plate (back electrode). The vibration of the diaphragm caused by the sound guided to the sound transducer 14 is converted into electric signals. This is also the case with a silicon microphone.

The structure and material of the housing 15 are not particularly limited. Typically, the housing 15 is made of resin. Usually, the sound-collecting opening 16 is the only opening that the housing 15 has. The state in which the sound transducer 14 is accommodated in the housing 15, the shape and size of the housing 15, the shape and size of the sound-collecting opening 16, the distance between the sound-collecting opening 16 and the sound transducer 14, and the shape of the terminals 17 are not particularly limited, either.

In the example shown in FIG. 4, the sound-transmitting membrane 1 is bonded to the housing 15 of the microphone 4 via the double-sided adhesive sheet 13. However, the method for bonding the sound-transmitting membrane 1 to the housing 15 is not particularly limited. The sound-transmitting membrane 1 may be bonded to the housing 15 by a technique such as an adhesive, heat welding, and ultrasonic welding. However, as shown in FIG. 4, it is preferable that the sound-transmitting membrane 1 is bonded to the housing 15 via the double-sided adhesive sheet 13 placed on the peripheral portion of at least one main surface of the sound-transmitting membrane because this is an easy method for bonding reliably the sound-transmitting membrane 1 to the housing 15.

[Electronic Device Having a Microphone]

FIG. 5 shows an example of a mobile phone as the electronic device having a microphone according to the present invention. In FIG. 5, a part of the cross section of the mobile phone is shown, including the microphone 4.

The microphone (microphone unit) 4 is accommodated in a casing 18 of a mobile phone 5A shown in FIG. 5. The casing 18 has a sound-collecting opening 19 for guiding sound from the outside to the microphone 4. The sound transducer 14 for converting the sound into electric signals is accommodated in the housing 15 of the microphone 4. The housing 15 is a rectangular parallelepiped with the inside being hollow. The housing 15 has, in one surface thereof, the sound-collecting opening 16 for guiding the sound introduced through the sound-collecting opening 19 of the casing 18 to the sound transducer 14 of the microphone 4. The sound-transmitting membrane 1 according to the present invention is bonded to the housing 15 and the casing 18 so as to cover the sound-collecting opening 16 of the housing 15 and the sound-collecting opening 19 of the casing 18 via a pair of double-sided adhesive sheets (not shown) bonded respectively to the peripheral portions of both of the main surfaces of the sound-transmitting membrane 1. The microphone 4 is connected electrically to a circuit board 20 of the mobile phone 5A by terminals (not shown) provided on a bottom surface of the housing 15. The electric signals into which the sound has been converted by the sound transducer 14 are outputted to the circuit board 20 via the terminals.

In the mobile phone 5A, the sound-transmitting membrane 1 disposed so as to cover both of the sound-collecting openings 16 and 19 allows sound to transmit through the sound-transmitting membrane 1 to the sound transducer 14 of the microphone 4 while preventing a foreign matter, such as dust and water, from entering into the sound transducer 14 through the sound-collecting openings. Thereby, it is possible to ensure the microphone performance while reducing the noise generation and failure of the microphone 4.

In the example shown in FIG. 5, the sound-transmitting membrane 1 is bonded to both of the housing 15 and the casing 18 so as to cover both of the sound-collecting opening 16 of the housing 15 and the sound-collecting opening 19 of the casing 18. However, the sound-transmitting membrane 1 may be bonded to at least one member selected from the housing 15 and the casing 18 so as to cover at least one of the sound-collecting openings, as long as the sound-transmitting membrane 1 allows sound to transmit through the sound-transmitting membrane 1 to the sound transducer 14 while preventing a foreign matter from entering into the sound transducer 14. From the viewpoint of preventing the entry of a foreign matter into the sound transducer 14, however, it is preferable that the sound-transmitting membrane 1 is bonded to both of the housing 15 and the casing 18 so as to cover both of the sound-collecting opening 16 of the housing 15 and the sound-collecting opening 19 of the casing 18.

Figure 6:
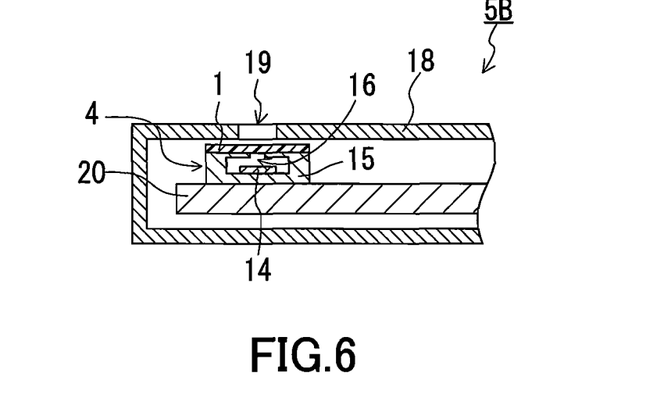
FIG. 6 is a cross-sectional view showing schematically another example of the electronic device having a microphone according to the present invention.
Figure 7:
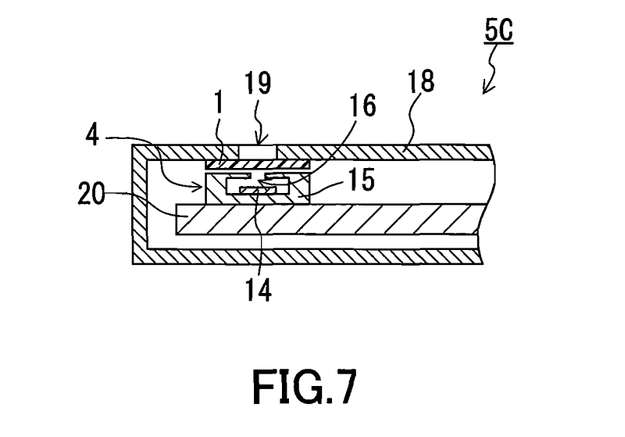
FIG. 7 is a cross-sectional view showing schematically still another example of the electronic device having a microphone according to the present invention.

FIG. 6 shows an example of a mobile phone in which the sound-transmitting membrane 1 is bonded to the housing 15. FIG. 7 shows an example of a mobile phone in which the sound-transmitting membrane 1 is bonded to the casing 18. Mobile phones 5B and 5C shown in FIGS. 6 and 7 have the same configuration as that of the mobile phone 5A shown in FIG. 5, except that the sound-transmitting membrane 1 is bonded only to one member selected from the housing 15 and the casing 18.

Figure 8:
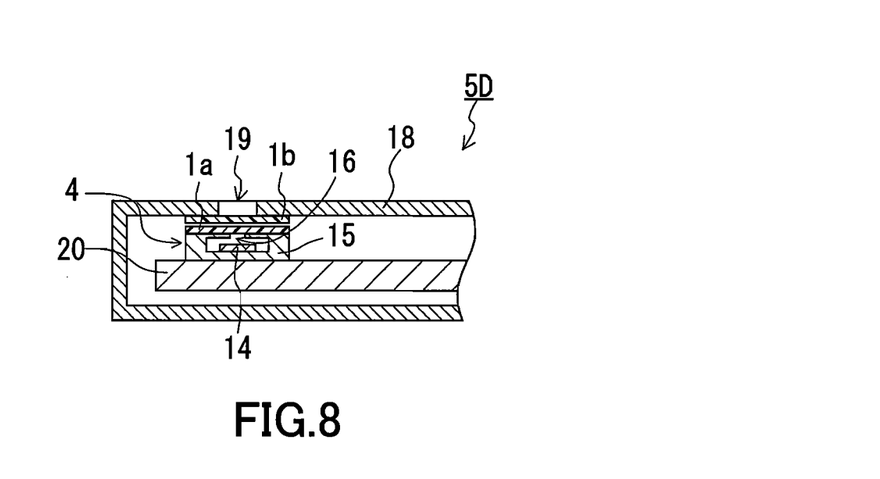
FIG. 8 is a cross-sectional view showing schematically further still another example of the electronic device having a microphone according to the present invention.

The electronic device having a microphone according to the present invention may have two or more sound-transmitting membranes according to the present invention. FIG. 8 shows an example of such an electronic device. In a mobile phone 5D shown in FIG. 8, one sound-transmitting membrane 1a is bonded to the housing 15 so as to cover the sound-collecting opening 16 thereof, and another sound-transmitting membrane 1b is bonded to the casing 18 so as to cover the sound-collecting opening 19 thereof. The mobile phone 5D shown in FIG. 8 has the same configuration as that of the mobile phone 5A shown in FIG. 5, except that the mobile phone 5D includes two or more sound-transmitting membranes 1 (1a and 1b), and the sound-transmitting membrane 1a, which is one of the two sound-transmitting membranes 1, is bonded to the housing 15 so as to cover the sound-collecting opening 16 and the sound-transmitting membrane 1b, which is another one of the two sound-transmitting membranes 1, is bonded to the casing 18 so as to cover the sound-collecting opening 19.

The state in which the microphone 4 is accommodated in the mobile phone 5A is not limited to that of the example shown in FIG. 5.

In the example shown in FIG. 5, the sound-transmitting membrane 1 is bonded to the housing 15 and the casing 18 via the double-sided adhesive sheets 13. However, the method for bonding the sound-transmitting membrane is not particularly limited. The sound-transmitting membrane 1 may be bonded to at least one member selected from the housing 15 and the casing 18 by a technique such as an adhesive, heat welding, and ultrasonic welding. However, as shown in FIG. 5, it is preferable that the sound-transmitting membrane 1 is bonded to the at least one member via the double-sided adhesive sheet 13 placed on the peripheral portion of at least one main surface of the sound-transmitting membrane because this is an easy method for bonding the sound-transmitting membrane 1 reliably.

The electronic device having a microphone according to the present invention is not limited to a mobile phone. It may be, for example, a digital camera, digital video camera, portable television, and transceiver, and a microphone unit mounted externally on an electronic device such as a voice recorder.

EXAMPLES

The present invention will be described in more detail with reference to Examples. The present invention is not limited to the following Examples.

First, the method for evaluating the sound-transmitting membranes produced in the Examples will be described.

[Surface Density]

The surface density of the sound-transmitting membrane was measured as follows. The sound-transmitting membrane was punched with a ϕ47 mm punch, and then the punched-out portion was measured for mass. The measurement was converted into weight per 1 m² to use as the surface density.

[Sound Transmission Loss]

The sound transmission loss of the sound-transmitting membrane (="a sound pressure measured when the sound-transmitting membrane is not disposed"—"a sound pressure measured when the sound-transmitting membrane is disposed") was evaluated as follows.

Figure 9:
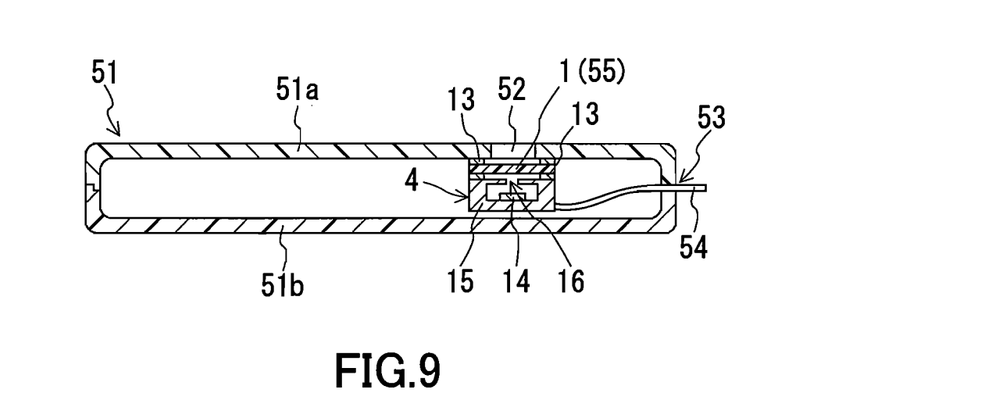
FIG. 9 is a schematic view for explaining the method for evaluating the sound transmission loss of the sound-transmitting membrane, used in Examples.

First, a mock-up casing (made of acrylic resin, with an outer dimensions of 70×50×15 mm) imitating a casing of a mobile phone was prepared. As shown in FIG. 9, a mock-up casing 51 is composed of two portions 51a and 51b, and the portions 51a and 51b can be engaged with each other. The portion 51a has a microphone attachment hole 52 ($\phi$=2 mm). The attachment hole 52 serves as a sound-collecting opening for guiding sound to the microphone after the microphone is disposed. The portions 51a and 51b are engaged with each other so as to form in the casing 51a space with no opening other than the attachment hole 52 and a microphone cable port 53.

Separately, the sound-transmitting membrane 1 produced in each Example and a sound-transmitting membrane 55 produced in each Comparative Example were punched out into circular shapes having a diameter of 8 mm with a Thompson mold. Subsequently, the double-sided tape 13 (No. 5620A, with a thickness of 0.2 mm, produced by Nitto Denko Corp.) punched out into a ring shape having an outer diameter of 8 mm and an inner diameter of 4 mm was bonded to peripheral portions of main surfaces of the punched-out sound-transmitting membrane 1 (or 55), and then the sound-transmitting membrane 1 (or 55) was bonded to the microphone unit 4 (SPM0208HD5, an Si microphone produced by Knowles) so as to cover the sound-collecting opening 16 of the unit 4, using the double-sided tape 13. The bonding was performed carefully so that the double-sided tape 13 was away from the sound-collecting opening 16 of the unit 4 and the sound-collecting opening 16 was covered completely with the sound-transmitting membrane 1 (or 55). Also, it was performed carefully so that the sound-transmitting membrane 1 (or 55) has no sagging in appearance. The microphone unit 4 has a configuration in which the sound transducer 14 is accommodated in the rectangular parallelepiped housing 15. The housing 15 has, in one surface thereof, the sound-collecting opening 16.

Next, as shown in FIG. 9, the microphone unit 4 with the sound-transmitting membrane 1 (or 55) bonded thereto was fixed to the microphone attachment hole 52 provided in the portion 51a of the casing 51, from a surface of the portion 51a to be inside when the portion 51a is engaged with the portion 51b, so that the sound-transmitting membrane 1 (or 55) faces the attachment hole 52 and covers the attachment hole 52. The microphone unit 4 was fixed to the portion 51a using the double-sided tape 13 adhered to a surface of the sound-transmitting membrane 1 (or 55) on the side opposite to the microphone unit 4 side. The fixing was performed carefully so that the double-sided tape 13 was away from the attachment hole 52 and the attachment hole 52 was covered completely with the sound-transmitting membrane 1 (or 55).

Next, the portions 51a and 51b were engaged with each other while a microphone cable 54 of the microphone unit 4 was drawn to the outside of the casing 51 through the port 53. Thus, the mock-up casing 51 for measuring the sound transmission loss of the sound-transmitting membrane was obtained. The port 53 was closed with a putty after the microphone cable was drawn therethrough.

Next, the microphone cable and a speaker (SCC-16A, produced by Star Micronics Co., Ltd.) serving as a sound source were connected to an sound evaluation apparatus (3560-B-030, produced by B & K), and the speaker was placed at a position 50 mm away from the microphone attachment hole 52 of the mock-up casing 51. Subsequently, as the evaluation method, SSR (Solid State Response) mode (test signals 20 Hz to 20 kHz, sweep up) was selected and performed to evaluate the sound transmission loss of the sound-transmitting membrane. The sound evaluation loss was evaluated as an average value in a frequency range of 300 and 4000 Hz. In evaluating the sound transmission loss, the same test was conducted on a mock-up casing to which only the microphone unit was fixed without the sound-transmitting membrane being disposed, and a blank sound pressure was measured in advance. The mock-up casing to which only the microphone unit was fixed was fabricated in the same manner as described above, except that no sound-transmitting membrane was used.

Example 1

100 parts by weight of PTFE molding powder (TFEM-12, produced by Daikin Industries Ltd.,) was mixed sufficiently with 0.2 parts by weight of activated carbon (produced by Wako Pure Chemical Industries, Ltd.) crushed in advance to remove therefrom particles with a particle diameter of 10 μm or more. Subsequently, the obtained mixture was introduced into a circular cylindrical metal mold with a height of 800 mm and an inner diameter of 200 mm, and preformed for 1 hour at a pressure of 280 kg/cm$^2$. Subsequently, the obtained PTFE preformed article was taken out from the metal mold, and then sintered at a temperature of 360° C. for 48 hours to obtain a circular cylindrical PTFE block with a height of about 500 mm and an outer diameter of about 200 mm. Subsequently, this block was accommodated in a stainless steel container with a height of 700 mm and an inner diameter of 200 mm, and the atmosphere inside the container was replaced with nitrogen. Then, the block was sintered further at a temperature of 340° C. for 20 hours to obtain a circular cylindrical PTFE block to be cut.

Next, the obtained PTFE block was cut, with a cutting lathe, into a PTFE film (skive film) having a thickness of 5 μm so as to be used as the sound-transmitting membrane. The air permeability of the obtained film was evaluated based on the Frazier air permeability prescribed in JIS L1096. As a result, the value thereof was 0, indicating that it was a film having no air permeability, that is, a nonporous film.

Examples 2 and 3

PTFE films with a thickness of 7 μm (Example 2) and 10 μm (Example 3) were obtained in the same manner as Example 1, except that the cutting thicknesses with the cutting lathe were 7 μm and 10 μm, respectively. These films were used as the sound-transmitting membranes.

Comparative Examples 1 and 2

PTFE films with a thickness of 15 μm (Comparative Example 1) and 25 μm (Comparative Example 2) were obtained in the same manner as Example 1, except that the cutting thicknesses with the cutting lathe were 15 μm and 25 μm, respectively. These films were used as the sound-transmitting membranes.

Examples 4 and 5, and Comparative Example 3

Commercially available PET films (produced by Teijin DuPont Films Japan Ltd.) with a thickness of 5 μm (Example 4), 15 μm (Example 5), and 30 μm (Comparative Example 3) were used as the sound-transmitting membranes.

Table 1 below shows the evaluation results of the sound-transmitting membranes of Examples 1 to 5 and Comparative Examples 1 to 3 in terms of the surface density and sound transmission loss.

TABLE 1

|  |  | Thickness (μm) | Surface density (g/m²) | Sound transmission loss (dB) |
|---|---|---|---|---|
| PTFE | Example 1 | 5 | 11.6 | 0.9 |
|  | Example 2 | 7 | 16.1 | 1.4 |
|  | Example 3 | 10 | 22.9 | 2.4 |
|  | C. Example 1 | 15 | 34.5 | 3.1 |
|  | C. Example 2 | 25 | 57.2 | 4.3 |
| PET | Example 4 | 5 | 6.4 | 1.9 |
|  | Example 5 | 15 | 18.7 | 2.8 |
|  | C. Example 3 | 30 | 37.3 | 3.1 |

As shown in Table 1, nonporous sound-transmitting membranes with a sound transmission loss of less than 3 dB were obtained in the case where the surface densities thereof were about 30 g/m² or less.

INDUSTRIAL APPLICABILITY

The sound-transmitting membrane for a microphone according to the present invention is composed of a nonporous film or a multilayer membrane including a nonporous film. Thus, it can prevent a foreign matter, such as fine dust, that is difficult for conventional sound-transmitting membranes to block from entering into the sound transducer of the microphone. Also, the sound-transmitting membrane for a microphone according to the present invention can prevent water vapor from entering into the sound transducer, and can suppress the water condensation at the sound transducer, which is observed with the conventional sound-transmitting membranes. Furthermore, by allowing the sound-transmitting membrane to have a surface density and sound transmission loss of specific values or less, it is also possible to ensure the microphone performance when the sound-transmitting membrane is disposed. The microphone including such a sound-transmitting membrane according to the present invention is highly reliable because the noise generation and failure caused by the entry of a foreign matter into the sound transducer are reduced.

The invention claimed is:

1. A sound-transmitting membrane member for a microphone, comprising:
   a sound-transmitting membrane to be disposed to a sound-collecting opening of the microphone and/or a sound-collecting opening of a casing of an electronic device having the microphone so as to allow sound to transmit through the sound-transmitting membrane while preventing a foreign matter from entering into a sound transducer of the microphone through the sound-collecting opening, the sound-transmitting membrane having two main surfaces positioned opposite to each other; and
   a double-sided adhesive sheet for bonding the sound-transmitting membrane to a member having the sound-collecting opening so as to cover the sound-collecting opening,
   wherein the double-sided adhesive sheet is placed on a peripheral portion of at least one main surface of the sound-transmitting membrane,
   wherein the sound-transmitting membrane is composed of a nonporous film or a multilayer membrane including a nonporous film,
   has a surface density of 30 g/m² or less, and
   has a sound transmission loss of less than 3 dB in a frequency range of 300 to 4000 Hz, and
   wherein both of the main surfaces of the sound-transmitting membrane are exposed to an outside of the sound-transmitting membrane member except for the peripheral portion on which the double-sided adhesive sheet is placed.

2. The sound-transmitting membrane according to claim 1, wherein the nonporous film has an air permeability between one main surface and the opposite main surface that is zero.

3. The sound-transmitting membrane according to claim 1, wherein the nonporous film has no pore that brings one main surface of the nonporous film into communication with the opposable main surface.

4. The sound-transmitting membrane according to claim 1, wherein the sound-transmitting membrane has uncovered and exposed faces on both of the main surfaces in a region that is configured to correspond to the sound-collecting opening.

5. A microphone, comprising:
   a sound transducer;
   a housing that accommodates the sound transducer and has a sound-collecting opening for guiding sound to the sound transducer; and
   a sound-transmitting membrane that is bonded to the housing so as to cover the sound-collecting opening and allows sound to transmit through the sound-transmitting membrane while preventing a foreign matter from entering into the sound transducer through the sound-collecting opening,
   wherein the sound-transmitting membrane is composed of a nonporous film or a multilayer membrane including a nonporous film,
   has a surface density of 30 g/m² or less, and
   has a sound transmission loss of less than 3 dB in a frequency range of 300 to 4000 Hz, and
   wherein the sound-transmitting membrane has uncovered and exposed faces on both main surfaces in a region that corresponds to the sound-collecting opening.

6. The microphone according to claim 5, wherein the sound-transmitting membrane is bonded to the housing via a double-sided adhesive sheet placed on a peripheral portion of at least one main surface of the sound-transmitting membrane.

7. The microphone according to claim 5, wherein the nonporous film has an air permeability between one main surface and the opposite main surface that is zero.

8. The microphone according to claim 5, wherein the nonporous film has no pore that brings one main surface of the nonporous film into communication with the opposable main surface.

9. An electronic device, comprising:
   a microphone comprising a sound transducer and a housing that accommodates the sound transducer and has a first sound-collecting opening for guiding sound to the sound transducer;
   a casing that accommodates the microphone and has a second sound-collecting opening for guiding sound to the microphone; and
   a sound-transmitting membrane that is bonded to at least one member selected from the housing and the casing so as to cover the sound-collecting opening of the at least one member and that allows sound to transmit through the sound-transmitting membrane while preventing a foreign matter from entering into the sound transducer through the sound-collecting opening of the at least one member,
   wherein the sound-transmitting membrane is composed of a nonporous film or a multilayer membrane including a nonporous film,
   has a surface density of 30 g/m² or less, and has a sound transmission loss of less than 3 dB in a frequency range of 300 to 4000 Hz, and wherein the sound-transmitting membrane has uncovered and exposed faces on both main surfaces in a region that corresponds to the sound-collecting opening of the at least one member.

10. The electronic device including a microphone according to claim 9, wherein the sound-transmitting membrane is bonded to the at least one member via a double-sided adhesive sheet placed on a peripheral portion of at least one main surface, of the sound-transmitting membrane.

11. The electronic device according to claim 9, wherein the nonporous film has an air permeability between one main surface and the opposite main surface that is zero.

12. The electronic device according to claim 9, wherein the nonporous film has no pore that brings one main surface of the nonporous film into communication with the opposable main surface.

* * * * *